United States Patent [19]

Schanker et al.

[11] Patent Number: 5,448,230
[45] Date of Patent: Sep. 5, 1995

[54] REMOTE DATA ACQUISITION AND COMMUNICATION SYSTEM

[75] Inventors: Jacob Z. Schanker, Rochester; Daniel H. Hollands, Webster, both of N.Y.

[73] Assignee: Metscan, Incorporated, Lima, N.Y.

[21] Appl. No.: 81,190

[22] Filed: Jun. 25, 1993

[51] Int. Cl.⁶ .................... H04Q 9/00; H04M 11/04; H04B 3/54
[52] U.S. Cl. .................... 340/870.03; 340/870.11; 340/539; 340/310.06; 375/200
[58] Field of Search ............ 340/539, 310 R, 310 A, 340/825.54, 825.52, 825.03, 825.07, 825.06, 825.11, 825.13, 310.07, 310.02; 375/1

[56] References Cited

U.S. PATENT DOCUMENTS

| | | | |
|---|---|---|---|
| 4,135,181 | 1/1979 | Bogacki et al. | 340/310 A |
| 4,315,251 | 2/1982 | Robinson et al. | 340/870.03 |
| 4,361,851 | 11/1982 | Asip et al. | 358/3 |
| 4,396,915 | 8/1983 | Farnsworth et al. | 340/820.03 |
| 4,446,462 | 5/1984 | Duellette et al. | 340/310 R |
| 4,799,059 | 1/1989 | Grindahl et al. | 340/870.03 |
| 4,850,010 | 7/1989 | Stanbury et al. | 379/107 |
| 5,056,107 | 10/1991 | Johnson et al. | 340/870.3 |

Primary Examiner—James J. Groody
Assistant Examiner—Glenton B. Burgess
Attorney, Agent, or Firm—Parkhurst, Wendel & Rossi

[57] ABSTRACT

A remote data acquisition and communication system includes a plurality of collector devices including a radio transmitter, optionally a plurality of concentrator devices including a radio transmitter, a radio receiver and a memory, a plurality of controller devices including a radio transmitter, a radio receiver and a memory, optionally a plurality of data communications nodes coupled to corresponding concentrator devices via a first communications link, and a data management platform computer coupled to the data communications nodes or the next lower level of devices via a second communications link. The collector devices, concentrator devices and controller devices communicate with one another via RF communications, preferably a single communication channel at a single carrier frequency. The collector devices preferably transmit data to the concentrator devices at intervals of between 4 to 6 hours and in preferred transmission bursts of less than 200 milliseconds, to minimize collisions between transmissions from different collector devices, and the transmitted data is sorted and redundancies discarded for each desired period of data keeping, i.e., typically daily.

26 Claims, 4 Drawing Sheets

A = Collector
B = Concentrator
C = Controller

, 230

REMOTE DATA ACQUISITION AND COMMUNICATION SYSTEM

FIELD OF THE INVENTION

The invention relates in general to remote data acquisition and communication systems. More specifically, the invention relates to a remote data acquisition and communication system for monitoring gathering and communicating data acquired or generated by a plurality of remote data collecting or monitoring devices. Utility meters are one example of such remote devices.

BACKGROUND

Utilities and other industries face a common problem of acquiring data from numerous remote points and communicating the data to a data processing center for analysis, billing, and other purposes. A typical example is a natural gas utility company that provides natural gas for a variety of domestic, commercial and industrial purposes. The natural gas utility company may have thousands or even millions of customer gas meters that must be regularly read to gather data for billing and other purposes. The data has traditionally been gathered by means of a human meter reader who goes from meter to meter and records each meter's reading. The recorded data is then returned to a central office and transferred to a computerized billing system. Other examples of utilities having similar problems are electric and water utilities.

Improvements in consumption data gathering procedures have been made over the years, but most systems still rely on human meter readers. Changes in lifestyles and societal conditions, however, have made it increasingly difficult for meter readers to gain access to domestic premises for meter reading. It is therefore an object of the invention to eliminate the need for human meter readers by automating the meter reading process.

SUMMARY OF THE INVENTION

The invention comprises a remote data acquisition and communication system that includes a plurality of data collector devices located at a number of distant, remote geographic locations, each including a radio transmitter, microcontroller and a memory; optionally one or more data concentrator devices each including a radio transmitter, a radio receiver, a microcontroller and a memory; one or more controller devices including a radio transmitter, a radio receiver, a microcontroller and a memory; optionally one or more data communications nodes coupled to the corresponding concentrator devices via a first communications link, and a data management platform main computer coupled to the data communications nodes or the next lower level of devices via a second communications link. Depending upon the application of the system, it may be possible to omit one or more of the intermediate levels, such as the concentrator devices and/or the data communications nodes.

The collector devices, concentrator devices and controller devices communicate with one another via RF communications, and preferably a single RF communications channel. The collector devices transmit data to the concentrator devices in brief transmissions, for example a transmission of less than 200 milliseconds in order to minimize collisions between transmissions from multiple collector devices. After an initial such brief transmission at a randomly determined time within a first time interval, subsequent brief transmissions from the same data collector occur at successive substantially identical intervals in a longer time period typically one full day, during which at least one successful data acquisition is desired from every data collector, which enables successful collection and processing of data from virtually all of a very large number of remotely located data collector devices, even if all are transmitting in a single RF channel, associated with one or more data concentrators.

BRIEF DESCRIPTION OF THE DRAWINGS

Reference should be made to the following detailed description of preferred embodiments of the invention and the accompanying drawings, wherein.

DETAILED DESCRIPTION OF PREFERRED EMBODIMENTS

Figure 1:
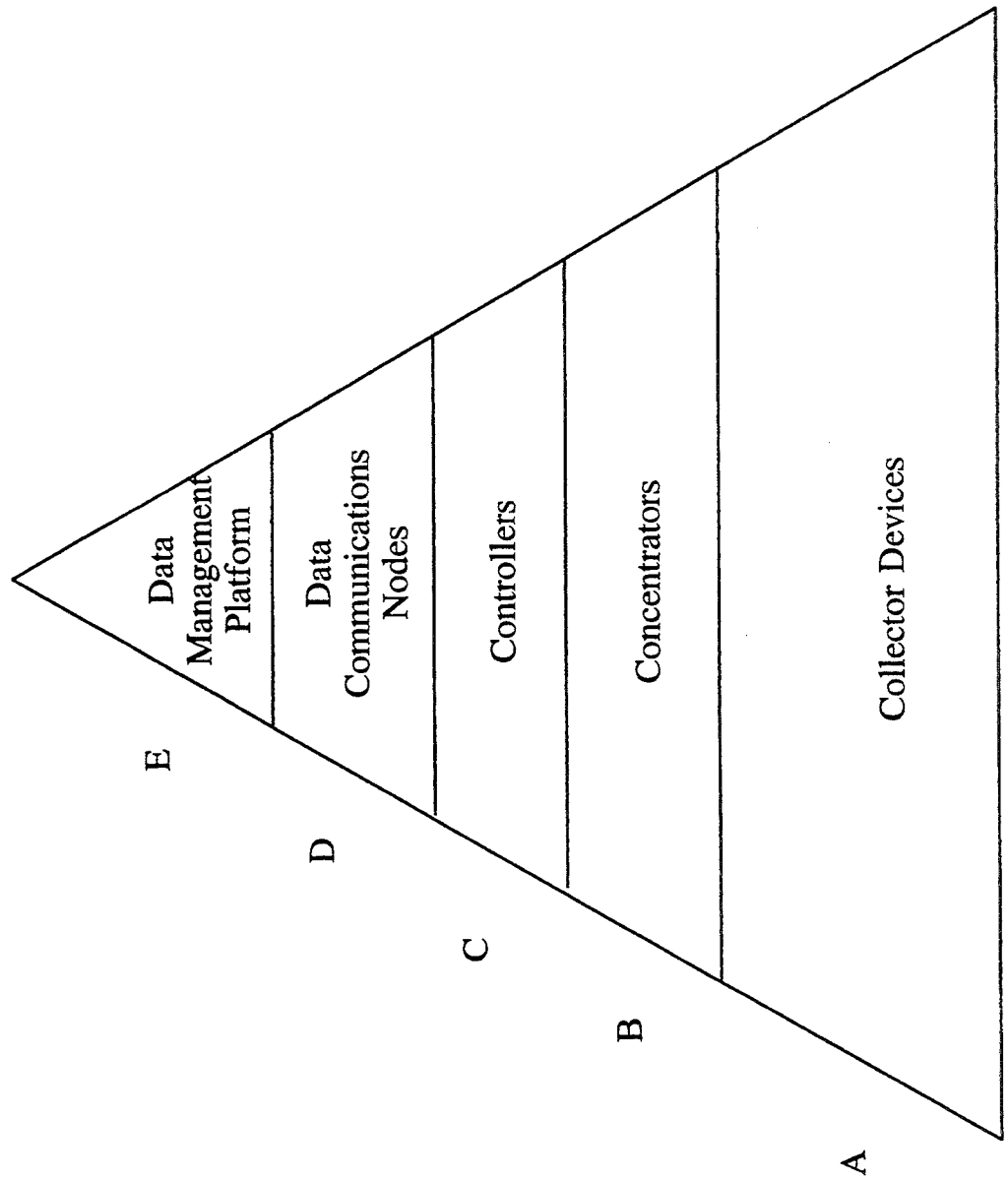
FIG. 1 schematically illustrates the hierarchal network structure of a remote data acquisition and communication system in accordance with the invention.
Figure 2:
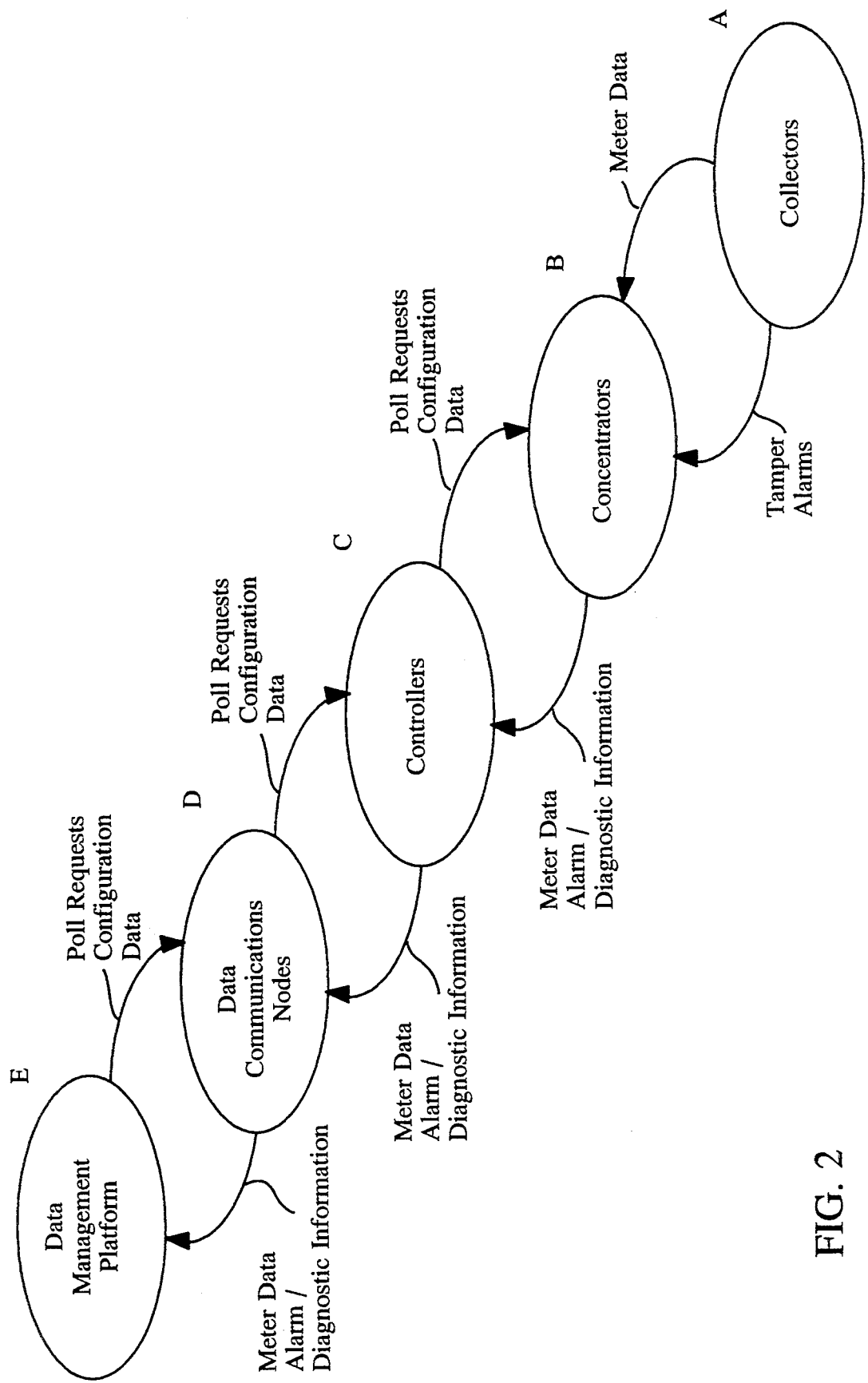
FIG. 2 is a schematic diagram illustrating the data flow within the hierarchal network structure of a remote data acquisition and communication system in accordance with the invention.
Figure 3:
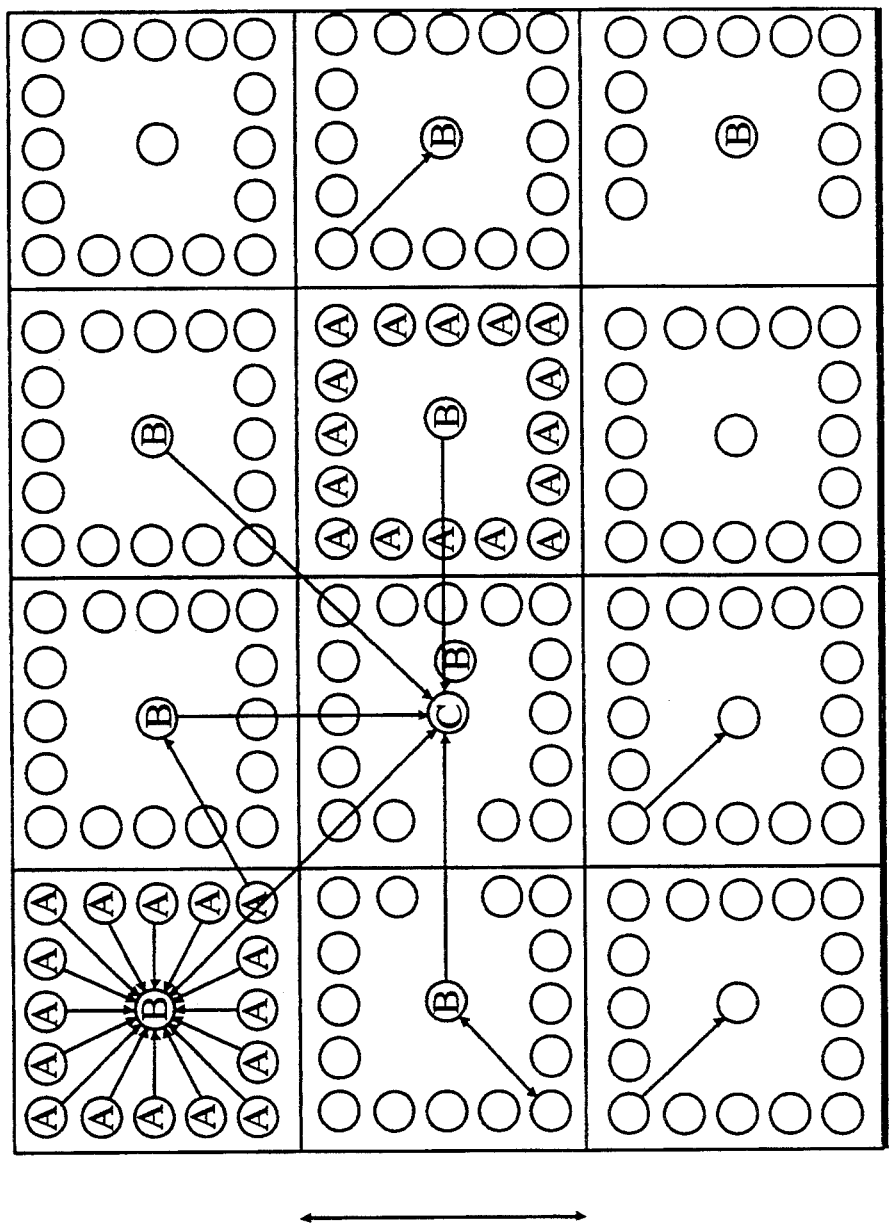
FIG. 3 schematically illustrates a geographical siting of the three lowest levels of the hierarchal network structure illustrated in FIGS. 1 and 2.

The invention provides a remote data acquisition and communication system that is arranged as a hierarchal network of preferably as many as five levels, A through E, respectively, shown schematically in FIG. 1 and in data flow diagram form in FIG. 2. The topology of the network in a typical geographical siting for the three lowest levels A to C, which communicate via radio transmission, is shown in FIG. 3. The lowest level A includes a plurality of collector devices which constantly monitor and store primary data such as gas consumption data generated by gas meters. At selected intervals, the collector devices transmit a low-power radio signal lasting a fraction of a second that carries cumulative consumption data to corresponding concentrator devices located at level B.

The concentrator devices of level B include a radio receiver, a radio transmitter and a microcontroller with a memory. Transmissions from all collector devices in the vicinity of a given concentrator device are received and stored in a memory of the concentrator device's microcontroller. In the concentrator device the date and time of each data acquisition from each data collector are associated with each packet of acquired data. The concentrator devices transmit data, and their time and date of acquisition, stored in that memory to corresponding controller devices at level C in response to a controller polling signal transmitted by the controller devices.

The controller devices at level C include a radio receiver, a radio transmitter, a microcontroller with a memory, and a physical communications link such as a telephone modem coupled to a conventional telephone line or a dedicated hard-wired communications link, although other means such as optical links or an alternate frequency radio link may be used. The controller devices generally transmit the controller polling signal to the concentrator devices once a day, but more frequent polling is possible where more current data readings are needed. Data from all of the concentrator devices within the vicinity and control of each controller device is stored in a memory of the controller device's microcontroller until the controller device receives a communications node polling signal from a data communications node at level D requesting that the data be uploaded from the controller device to the data communications node. Data transfer between the controller devices at level C and the data communications nodes at level D is preferably accomplished over telephone lines or equivalents thereof as described above or, alternatively, wireless or optical communication links may be utilized for this purpose.

Each data communications node at level D preferably includes a minicomputer that can serve a relatively large geographic area including up to one million or more collector devices. The data communications nodes at the D level are coupled to level E via a dedicated wideband communications link, such as a telephone line, T1 carriers, fiber optic networks integrated systems digital networks (ISDN), surface microwave links, satellite communications links or meteor burst communications links. Depending upon the application of the system and the number of collector devices in the system, it may be possible to omit one or more of the intermediate levels, such as the devices and/or the communications nodes.

The data management platform at level E is the main computer for the entire data acquisition system, and provides system database and network management information, and serves as a gateway to the utility's billing system.

It should be appreciated that some minor number of collector transmissions intended for a specific concentrator will also be received by one or more other concentrators. Redundant messages may be sorted, recognized and eliminated at one or more network levels above the B level, for instance at any of the C, D and E levels, to eliminate the additional loading on network resources in carrying duplicate data.

The collector devices employed at level A are fitted either directly to utility meters or are located at locations remote from the utility meters, and connected to a counting or pulse output of the utility meter via a cable. Collector devices may also be made an integral part of newly designed meters, especially substantially non-mechanical solid-state meters. The collector devices preferably include input conditioning circuits, pulse counting circuits, a low power radio transmitter, and power control circuits all under the control of a microcontroller, such as an MC68HC705B5 manufactured by Motorola.

While the inventive system is here being described in conjunction with acquisition and communication of data from a plurality of remotely located gas meters as a representative application of the inventive system, the system has applications in other fields, including other or multiple utility metering applications, such as other energy metering applications as electric meter reading, and non-energy metering applications such as water consumption metering. Furthermore, the system is capable of simultaneously acquiring, communicating and processing data from a plurality of different utility metering sources, such as simultaneous acquisition of data from remote gas, water and electric meters, two or more of which are typically located at the same dwelling or business location.

To make the system economically viable and economically advantageous, it is desirable that the collector devices be low in initial cost, easy to install, and operate for an extended period of time with minimal power drain. The objective of minimal power drain is achieved by using low current consumption circuitry within the collector devices and by the fact that the collector devices contain only a radio transmitter, i.e., the collector devices are transmit-only devices and are not required to receive polling commands from higher level devices. Thus, the collector devices are not required to have receivers that must be maintained in an operational state in order to receive polling commands which would add significantly to the load on the collector device's battery or power supply and reduce the achievable operating life. The collector devices are also more economical without receiver circuitry.

Indeed, the power requirements of all units at all levels of the system should be minimized. For example, the radio transmitter power outputs of all units is very low, typically on the order of ten (10) milliwatts. Other efficiencies are achieved by the inventive system through the use of RF transmissions among several levels of the system which minimizes the number and duration of telephone connections required by the system, thus minimizing operational costs.

To employ transmit-only collector devices, however, a method should be provided to insure that transmissions from the collector devices are received by the concentrator devices, since an acknowledgement or request for a repeat transmission cannot be received by the collector devices. The ultimate intended destination for data transmitted from the collector devices is not the concentrator devices at the B level, but is the data management platform at the E level. Thus, since data from only one meter reading from each meter each day is typically desired at the E level, real-time confirmation of reception is not necessary. It is enough that the processor at the E level knows, by organizing all data received, which collector devices have reported data during any specific 24 hour period.

To reduce operating costs associated with battery replacement, a long-life primary cell battery such as a size AA lithium thionyl-chloride battery which has an open circuit voltage of 3.6 volts and a voltage under load of 3.3 volts should be used. With the minimized current consumption, a collector operating life of ten years without battery change can be achieved.

The range of the units of the system which rely on radio communications, namely the A, B and C levels schematically illustrated in the geographical siting diagram of FIG. 3, depends on a number of factors, all of which may differ in different implementations. Among these factors are transmitter power output, antenna gain or loss, antenna height at both transmitter and receiver, frequency of operation, receiver sensitivity, local conditions with regard to obstructions such as walls, buildings, metal objects, and ambient noise levels. The signal level at a given range is not an absolute, but should also include a statistical variability factor or confidence level.

For example, for a typical implementation of this system operating at 184 MHz and with an A unit with integral antenna installed at a height of 4 feet and with 10 milliwatts effective radiated power, the range to a B unit with 1 microvolt sensitivity and a unity gain antenna at 20 foot elevation is approximately 0.27 miles with 99.9% confidence when the effects of typical wall and building attenuation of 12 dB is included. The range between a B unit and a C unit, both with 10 milliwatts transmitter power output, 1 microvolt sensitivity and with unity gain antennas at 20 foot elevation is approximately 0.65 miles, including a 6 dB factor for attenuation by obstructions. Based on an A to B unit range of 0.27 miles, a B unit will typically serve an area of A units of 0.23 square miles, and a C unit will typically serve an area of surrounding A and B units of 1.3 square miles.

In seeking to operate such a radio-based data collection system that may involve thousands or even millions of individual meter/collector devices, it is impractical to expect to be able to use any large number of different RF bands for data transmission. Numerous different RF bands are simply not readily available for substantially full time use. However, when numerous devices within a system are communicating on the same or adjacent RF bands, transmission interference and degradation can be real problems. And, these problems multiply as the number of transmitting devices and transmissions increase within a system. Surprisingly, the present inventors have developed a system which can successfully handle literally millions of data transmissions daily in a system of thousands to millions of transmitting devices. Preferably, all of those devices will be operating in a single RF channel or frequency.

All radio communications for the entire network, no matter how numerous the number of transmitting collectors, and no matter how widespread in diverse geographic locations, preferably can take place on a single radio channel. The network expects that collisions between simultaneous transmissions will occur and makes allowances for these occurrences. In one embodiment, a channel width of 50 kHz and a carrier frequency within the 183.5 to 184.5 MHz band may be employed. In a second embodiment, a channel width of 25 kHz may be employed and the carrier frequency may be in the 216 to 220 MHz band. In still another embodiment a channel width of 12.5 kHz and a carrier frequency, or paired frequencies, at about 928/952 MHz or 956 MHz or 932/941 MHz may be employed. It will be understood, however, that other frequencies and channel widths may be readily employed. Specific assigned carrier frequencies are typically subject to regulatory approval in the locale in question.

It should be appreciated that there is no absolute guarantee that an individual transmission from a collector device will be received by a concentrator device. There may be temporary interference on the radio frequency employed. There is also a finite possibility that more than one collector device in a given geographical area may be transmitting at the same time, causing interference or collisions which may render either or both transmissions not fully receivable at a single concentrator device.

The invention minimizes the probability of collisions between simultaneous transmissions from two or more collection devices by limiting the duration of a collector device transmission preferably to about 180 to 200 milliseconds or less. If the probability of a collision in a specific time interval is represented by $p_c$, then the probability of a data transmission being successfully received by a concentrator device without destructive collision is $p_s = (1 - p_c)$. The probability of successful transmission can be improved markedly by transmitting more than once in a 24 hour interval, i.e., by introducing temporal diversity. That is, $P_c$ is a function of the number of repetitions of a particular transmission within the desired transmission period. The inventors have demonstrated by computer simulation that there is a preferred number of repetitions to maximize the probability of successful reception of a maximum number of transmissions. Too many repetitions increase the traffic and can lead to excessive collisions, as well as increasing battery load. The number of repetitions depends on the unimproved probability of success of a single transmission.

Since the success of each transmission is an independent event, the probability of at least one successful transmission in a 24 hour period is $P_s = (1 - p_c)^n$, where n is the number of transmissions by a collector device per 24 hour period. The inventors' computer simulations have determined that the preferred interval between transmissions is between 4 and 6 hours, i.e., n being between 6 and 4. In a preferred embodiment, a 6 hour transmission interval, i.e., n=4, is employed.

A computer simulation of the behavior of many A units operating within the geographic area served by a single B unit and transmitting at random once within a 6 hour period was written in Microsoft Quick Basic and executed on a personal computer with an 80286 microprocessor and 80287 math co-processor chip. The duration of an A unit's transmission was assumed to be 200 milliseconds. There are 21,600,000 milliseconds in a 6 hour period. An array was filled with numbers generated by a random number generation routine representing the starting time of a call in milliseconds from the beginning of a 6 hour period. The adjacent cells of the array were then checked by the program to see if there was any overlap in time within the assumed 200 millisecond call duration. Any such overlap was counted as a collision. Enhancements to the program also permitted simulating B unit transmissions which might also collide with A unit transmissions at another B unit's receiver. The number of A units simulated ranged from 100 to 15,000. Calling periods other than 6 hours were also simulated.

Table I below presents the simulation results showing the improvement in the probability of success obtainable by multiple transmissions. We have already noted that the probability of successful transmission is a function of the number of repetitions of a particular transmission within the desired transmission period. That probability is also a function of the number of collector devices transmitting in a given area, which, in turn, is generally a function of customer density and the radio transmission range of the collector devices' transmitters and concentrator devices' receivers. Very high densities can be handled by the system described herein.

TABLE I

COMPUTER SIMULATION OF COLLECTOR TRANSMISSION COLLISIONS

| No. of A units | Recall period Hours | Call length milliseconds | Average no. of collisions | Probability of collision for an A unit | Probability of completed transmission in recall period | Probability of completed transmission in 24 hours |
| --- | --- | --- | --- | --- | --- | --- |
| 100 | 6 | 200 | 0 | | 100.00000% | 100.0000000% |
| 200 | 6 | 200 | 0 | | 100.00000% | 100.0000000% |
| 300 | 6 | 200 | 2 | .66667% | 99.33333% | 99.9999998% |
| 400 | 6 | 200 | 4 | 1.00000% | 99.00000% | 99.9999990% |
| 500 | 6 | 200 | 4 | .80000% | 99.20000% | 99.9999996% |
| 600 | 6 | 200 | 6 | 1.00000% | 99.00000% | 99.9999990% |
| 700 | 6 | 200 | 8 | 1.14286% | 98.85714% | 99.9999983% |
| 800 | 6 | 200 | 11 | 1.37500% | 98.62500% | 99.9999964% |
| 900 | 6 | 200 | 14 | 1.55556% | 98.44444% | 99.9999941% |
| 1000 | 6 | 200 | 18 | 1.80000% | 98.20000% | 99.9999895% |
| 2000 | 6 | 200 | 67 | 3.35000% | 96.65000% | 99.9998741% |
| 3000 | 6 | 200 | 153 | 5.10000% | 94.90000% | 99.9993235% |
| 4000 | 6 | 200 | 289 | 7.22500% | 92.77500% | 99.9972751% |
| 5000 | 6 | 200 | 441 | 8.82000% | 91.18000% | 99.9939483% |
| 6000 | 6 | 200 | 631 | 10.51667% | 89.48333% | 99.9877676% |
| 7000 | 6 | 200 | 854 | 12.20000% | 87.80000% | 99.9778467% |
| 8000 | 6 | 200 | 1108 | 13.85000% | 86.15000% | 99.9632041% |
| 9000 | 6 | 200 | 1372 | 15.24444% | 84.75556% | 99.9459935% |
| 10000 | 6 | 200 | 1672 | 16.72000% | 83.28000% | 99.9218471% |
| 11000 | 6 | 200 | 2003 | 18.20909% | 81.79091% | 99.8900607% |
| 12000 | 6 | 200 | 2387 | 19.89167% | 80.10833% | 99.8434386% |
| 13000 | 6 | 200 | 2792 | 21.47692% | 78.52308% | 99.7872409% |
| 14000 | 6 | 200 | 3134 | 22.38571% | 77.61429% | 99.7488785% |
| 15000 | 6 | 200 | 3623 | 24.15333% | 75.84667% | 99.6596637% |

Figure 4:
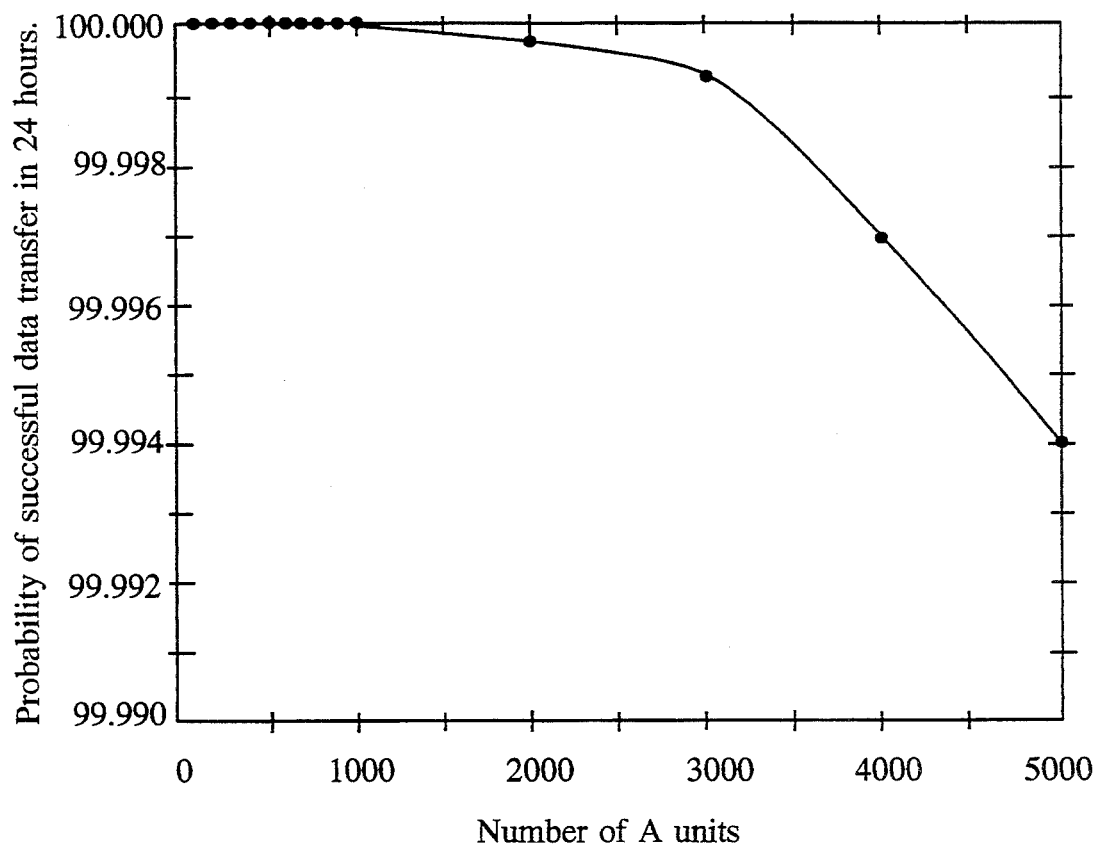
FIG. 4 graphically illustrates the probability of successful transmission for every collector per day versus the number of collector devices per concentrator device.

FIG. 4 is a graph showing the probability of successful transmissions for every collector per day versus the number of collector devices A per concentrator device B.

Such highly desirable results are obtained by randomizing the initial transmission times of all collector devices so that their transmissions tend to be evenly spread over the calling interval, here six hours, within which each transmission is to occur, and by further very slightly randomizing the length of the actual interval. After installation of a battery in a collector device, the first regular transmission occurs at a time in an interval of specified time length, such as between 0 and 6 hours. The exact time of the first transmission is a uniformly distributed random variable. This ensures that transmission times of multiple data collectors will be evenly distributed over the transmission interval. Subsequent transmissions occur at identical transmission intervals after the first transmission, except that a small randomness, such as about 30 seconds of variation, of this interval is purposely introduced. This ensures that should two or more specific collector device transmissions collide during one transmission interval, they will not collide during the next transmission interval, thereby preventing the collector devices from getting into lockstep synchronization with attendant degradation of the probabilities of successful data transmissions from multiple collectors.

All radio transmissions take place using a radio data protocol based on the X.25 packet standard to guarantee that received data will be error free. Collector device transmissions are preferably sent in an unconnected broadcast mode, as described above, while concentrator device and controller device transmissions establish successful connections and send acknowledgements when a data packet transmission is correctly received. If a packet is received corrupted, it is recognized and discarded and a request for it to be retransmitted is sent to its source within the system.

Polling or collection of the data from each concentrator preferably takes place once in a 24 hour period, but more or less frequent polling is also possible. In fact, the E level can control all the resources of the network down to the B level. By determining which C units poll which B units, and when they poll, the E level exercises significant control over the radio channel resource. This control can be used to maximize channel availability and to minimize the probability of collisions.

All communications between the A, B and C levels are preferably wireless, being a carried by radio signal operating preferably on a single channel typically in the very high frequency (VHF) range, although the system may be operated in the ultra high frequency (UHF) range. In one embodiment, direct frequency shift keying modulation with a 1200 bit per second modulation rate is used. The maximum deviation is $+/-4$kHz. Other types of modulation and different parameters may also be employed. The type of modulation is not a limiting feature of the invention.

Another significant feature of the system is that alarm conditions, which for gas meter monitoring may be conditions such as power failure, a tamper or tilt indication given by the meter, or any other malfunction, can override standard operating instructions and be sent up the network immediately. Although the normal mode of operation is to poll down the network from highest to lowest level, except for the A to B link, the flow is the reverse in the case of an alarm condition. Alarm messages are transmitted immediately when they are sensed by a collector device, bypassing the normal 6 hour calling interval sequence. When alarm messages are received by a concentrator device, they are immediately re-transmitted from the concentrator device to a controller device. The controller device initiates a call to its corresponding data communications node with the alarm. The communications node then informs the data management platform of the alarm condition. Software filters can be employed at each level to prevent false alarm calls from flooding the network. Depending on the quantity and frequency of alarm calls from a given source, or from a given area, a decision can be made not to forward calls, but merely to report their having been made at the next regular reporting interval or call.

As previously stated, communications are normally initiated in the downwards direction, from highest to lowest level. Thus, the E level calls the D level to request that it send its stored data, operating statistics, and diagnostic or other information. The E level can also instruct the D level to modify its operating parameters, such as its polling schedule, for calling C level controllers, and send the D level new configuration data which may be for the D level or for a lower level such as the C or B levels, which the D would then forward down the network. The E level can also send new or revised operating software to any of the lower levels except the A level. This permits revisions to be made without physically visiting the lower level sites.

The invention can be utilized to remotely monitor and gather any type of data at a variety of remote points of data generation. The invention is particularly useful, however, in remotely monitoring consumption data generated by utility meters at a large plurality of diverse remote geographic locations.

EXAMPLE

The various levels of the inventive system may be realized using the following equipment and software The collector is a self-contained unit which may be mounted, for example, on an existing gas meter, mounted on a bracket affixed to a wall or other suitable location, or may be incorporated within new meter designs. The utility meter or other device should produce contact closures or pulses which are fed to the input circuitry of the collector. Typically, the rate of contact closures is related to the rate of flow of the measured quantity of the gas, electricity or other mediums being metered. For instance, in the case of gas meters a cycle of contact closure opening and closing may correspond to one cubic foot of gas flow.

The input circuitry must be able to detect a change in state of the monitored contacts—there are normally two contacts monitored: one for usage and one for tamper or alarm. Tamper or alarm contacts are normally closed, opening in case of a tamper or alarm. The usage contacts may be either open or closed at a given time depending on the past history of usage. The detection of change of state should be accomplished with a minimum of power consumption. This may be achieved using input circuitry as described in copending U.S. patent application Ser. No. 07/801,855 filed Dec. 3, 1991, or by well-known techniques using integrated circuit flip-flops or bistable gates. Using CMOS integrated circuits minimizes the current drain.

When a state change is detected, a CMOS microcontroller such as the Motorola MC68HC705B5, which is normally in a sleep mode or operating at very slow speed to minimize current drain, receives an interrupt signal to awaken it so that it can increment an internal register or memory location which stores the cumulative count of meter contact state changes or pulses. Because the contact pulse rate is typically no greater than 4 Hz, it is not necessary to continuously monitor the contact state (Open or closed) but only to examine the state sufficiently frequently to ensure that a change of state cannot be missed, resulting in significant power savings. Timing for the input circuitry is provided by a separate timing circuit, independent of the microcontroller, to minimize current drain.

When a state change in tamper or alarm contacts is detected, the CMOS microcontroller receives an interrupt signal which awakens it and directs it immediately to format an alarm message and energize the transmitter to transmit said message. By this means, alarms may be sent immediately, independent of all other timing considerations in the collector.

When first energized by connecting the battery, the microcontroller executes a boot routine stored in ROM which initializes the collector and which begins running a pseudo-random number generator which produces an output number representing a time period typically between 0 and 6 hours. The microcontroller then begins a count until it reaches that number, or counts down from that number until it reaches zero. At this time, the transmitter is enabled and a collector data transmission, formatted and timed by the microcontroller, is transmitted. This randomization of the first call within the allotted calling period, typically 6 hours, helps ensure that two or more collectors which may have been installed and energized at the same time will have a very small probability of transmitting at the same time, thus minimizing mutual interference caused by "collisions," i.e., simultaneous transmissions from two or more proximately located collector devices.

Because of the current drain with the microcontroller operating at normal speed, subsequent transmissions, which are at nominally fixed intervals, are timed by a separate low current drain timing circuit. The tolerances inherent in such a timer circuit introduce some randomization of the actual interval about the nominal interval. This randomization will typically differ from unit to unit, which is desirable. A small degree of additional randomization, typically 10 to 30 seconds, can also be introduced by the microcontroller when the timer circuit awakens it for a transmission. By utilizing the various randomizing techniques described herein, the time intervals for transmissions from each collector device can have beginning and end times which are independently randomly related to those of other collector devices in the same system.

The transmitter is typically a crystal controlled transistor oscillator operating at one-third the desired output frequency, followed by a tripler amplifier and a final output amplifier. Other combinations are also possible. Modulation is introduced by a voltage variable capacitor in the oscillator circuit which shifts the output frequency a small amount, typically 2 to 4 kHz, in accordance with the modulating binary data signal produced by the microcontroller. The data rate, typically 1200 bits per second, is controlled by the microcontroller clock, and the duration of transmission, which is typically 180 to 200 milliseconds, is a function of the number of bits in the data message. The antenna is integral to the assembly, whether the collector is a separate assembly or built-in to a meter. For maximum radiation efficiency and circularity of radiation pattern, a normal mode helical antenna or inductively loaded vertical is normally employed. The physical height of these antennas is much less than a quarter wavelength. Other well-known types of antennas may be used, for instance a loop antenna.

The concentrator and controller units are similar in design and construction, differing mainly in the instructions executed by the microcontroller which is part of the unit. The concentrator and controller units comprise a radio transmitter and receiver, together with a microcontroller such as the Motorola MC68HC16Y1 and both non-volatile and volatile integrated circuit memory devices. The design of the radio receiver and transmitter may follow well-known design techniques, for instance a crystal-controlled double-conversion superhetrodyne receiver with discriminator detector, and a crystal-controlled transistor oscillator and multiplier chain followed by an output power amplifier. Frequency generation for the receiver and transmitter may also be accomplished using frequency synthesis. To accommodate long-term drift in the frequency of collector units being received, scanning of the assigned channel bandwidth may be incorporated in the receiver. Specific techniques depend, in part, on the assigned operating frequency band of the system. Any standard antenna suitable for the assigned band may be used, and connected to the concentrator or controller through a length of coaxial transmission line.

Power for the concentrator is preferably derived from internal sealed lead-acid storage batteries recharged from a photo-voltaic solar panel. Power for the controller may be derived in a similar fashion, or recharging may be accomplished by a mains operated internal charger circuit.

The controller must also have means for communicating with the D level data communications node. Typically, this will be a standard telephone modem for connection to telephone lines.

The concentrator receives transmissions from collector units within range. The microcontroller, under program control, disassembles the received data packet, checking the cyclic redundancy check (CRC) bytes for data integrity, and then appends the date and time the message was received from the collector before storing the data. Also stored with the data are the unique identification bytes assigned to each collector and permanently stored in the collector's non-volatile memory.

A sorting routine in the concentrator program checks to see whether a previous message had been received from the collector but not yet forwarded to the next higher level controller unit if this is the case, the concentrator may effectively overwrite the older data so that only the most recent data from a collector is actually sent up the network when the concentrator is polled by its controller.

Further sorting for redundant data is performed at the C, D and E levels under program control. For example, more than one concentrator may receive the same message from a given collector. If these concentrators report their data to the same controller, the controller can sort and recognize the redundancy and store only one of the messages. This reduces the traffic loading between the C level concentrator and the D level. Because concentrators receiving the same collector message may also, on occasion be reporting to different controllers, the D level data communications node also sorts to see if the same collector data has been received from different controllers. If this is the case, the duplication is eliminated. This reduces storage requirements and the traffic loading between D level and E level.

The E level data management platform also performs sorting for redundant data. One way that this may occur is if two or more C level concentrators having the same A level collector message report to different D level data communications nodes. This would be relatively infrequent, generally occurring only along boundaries between adjacent D level data communications node regions.

Together these A-E level devices cooperate to provide a remote data acquisition and communication system which enables successful collection and processing of large amounts of data collected from virtually all of a very large number of remotely located data collector devices, even if all are transmitting in a single RF channel.

The invention has been described with reference to certain preferred embodiments thereof. However, it will be understood, that modifications and variations are possible within the scope of the appended claims.

What is claimed is:

1. A remote data acquisition and communication system, comprising:
a large number of data collector devices each comprising a radio transmitter, with all of said radio transmitters designed to transmit at the same carrier frequency and each of said collector devices designed to transmit a data transmission at said frequency at each of a plurality of specified intervals of substantially identical duration, each collector device being designed to pseudo-randomly select the time of its first data transmission after it is at a random time first supplied with electrical power, and each collector device being designed to pseudo-randomly very slightly change the duration of the interval between its data transmissions, whereby said time intervals for each collector device have beginning and end times which are independently randomly related to those of other collector devices in the system;
and a plurality of controller devices, each including a radio transmitter also designed to operate at said carrier frequency, a radio receiver for receiving data transmissions at said carrier frequency, and a memory for storing received data;
and a data management platform computer for receiving data transmissions, controlling the system and processing the received data.

2. The system of claim 1, wherein said data management platform computer is coupled to each controller device via a two-way communications link.

3. The system of claim 1, wherein the radio transmitter transmits collected data at specified time intervals of about 4 to 6 hours.

4. The system of claim 1, wherein the radio transmitter transmits collected data at specified time intervals of about 6 hours.

5. The system of claim 1, additionally comprising a plurality of data communications nodes each including a radio receiver for receiving data transmissions from said controller devices, a radio transmitter for transmitting polling signals to said controller devices, and a memory, and each of said data communications nodes is coupled to a plurality of controller devices via first communications links, and each of said communications nodes is coupled to said data management platform by a second communications link.

6. The system of claim 1, wherein the carrier frequency is within the VHF range.

7. The system of claim 1, wherein the carrier frequency is within the UHF range.

8. The system of claim 1, wherein the carrier frequency is within the 183.5 to 184.5 MHz band.

9. The system of claim 1, wherein the carrier frequency is within the 216 to 220 MHz band.

10. The system of claim 1, wherein the carrier frequency is about a frequency or paired frequencies selected from the group consisting of: 928/952 MHz, 956 MHz and 932/941 MHz.

11. The system of claim 1, wherein the radio transmitter in each collector device transmits in short bursts each of duration of no more than about 200 milliseconds.

12. The system of claim 1, wherein the radio transmitter in each collector device transmits in short bursts each of duration of no more than about 180 milliseconds.

13. The system of claim 1, wherein the radio transmitter in each collector device transmits in short bursts each of duration in the range of about 180 to 200 milliseconds.

14. The system of claim 1, wherein the power output of the radio transmitter in each collector device is about 10 milliwatts.

15. The system of claim 1, wherein each collector device is capable of transmitting an alarm signal up the system immediately upon detection of an alarm condition.

16. The system of claim 1, wherein a controller receives transmissions from about 5,000 collectors.

17. The system of claim 1, wherein the number of collectors exceeds 1,000,000.

18. The system of claim 1, additionally comprising a plurality of concentrator devices, each including a radio transmitter for communicating with said controller devices, a radio receiver for receiving data collector transmissions from said collector devices and a memory for storing data received from said collector devices.

19. The system of claim 18, wherein each concentrator is at a fixed non-mobile geographic location.

20. The system of claim 18, wherein each of said concentrator devices is capable of associating with each packet of data received from each collector additional data indicating the time and date of each data packet and the identity of the collector from which it was received.

21. The system of claim 18, wherein the data management platform computer is capable of directing the controllers to poll the concentrators at least one time within a determined period of time to ensure accurate data acquisition.

22. The system of claim 21, wherein the data management platform computer directs the controllers to poll the concentrators at least once within each 24-hour day.

23. The system of claim 20, wherein any of the concentrators, controllers and the data management computer are capable of identifying and discarding redundant data acquired for any determined period of time.

24. The system of claim 5, wherein each of said concentrator devices is capable of associating with each packet of data received from each collector additional data indicating the time and date of each packet and the identity of the collector from which it was received, and at least one among the concentrators, controllers, data communications nodes and the data management platform computer is capable of identifying and discarding redundant data acquired for any determined period of time.

25. The system of claim 5, wherein said communication links are via a system selected from the group consisting of telephone lines, T1 carriers, fiber optic networks, integrated systems digital networks, surface microwave links, satellite communications links, and meteor burst communications links.

26. The system of claim 18, wherein a concentrator device receives transmissions from about 5,000 collectors.

* * * * *